(12) United States Patent
Hershkovich (10) Patent No.: US 9,644,934 B2
(45) Date of Patent: May 9, 2017

(54) COMBINATION SQUARE WITH SWIVEL HEAD

(71) Applicant: Zvi Hershkovich, Karmiel (IL)

(72) Inventor: Zvi Hershkovich, Karmiel (IL)

( * ) Notice: Subject to any disclaimer, the term of this patent is extended or adjusted under 35 U.S.C. 154(b) by 130 days.

(21) Appl. No.: 14/312,922

(22) Filed: Jun. 24, 2014

(65) Prior Publication Data

US 2014/0373373 A1    Dec. 25, 2014

Related U.S. Application Data

(60) Provisional application No. 61/838,379, filed on Jun. 24, 2013.

(51) Int. Cl.
  *G01B 3/56* (2006.01)
  *G01B 3/04* (2006.01)
  *G01B 5/00* (2006.01)

(52) U.S. Cl.
  CPC ............... *G01B 3/566* (2013.01); *G01B 3/04* (2013.01); *G01B 3/563* (2013.01); *G01B 5/00* (2013.01)

(58) Field of Classification Search
  CPC . G01B 3/566; G01B 5/00; G01B 3/04; G01B 3/563; G01B 3/56
  USPC .......................................... 33/427, 520, 534
  See application file for complete search history.

(56) References Cited

U.S. PATENT DOCUMENTS

| | | | | |
|---|---|---|---|---|
| 253,945 | A * | 2/1882 | Richards | B43L 7/14 33/427 |
| 778,808 | A * | 12/1904 | Starrett | 33/342 |
| 1,036,491 | A * | 8/1912 | Henderson | G01C 9/24 33/343 |
| 1,139,648 | A * | 5/1915 | Demmer | G01B 3/56 33/419 |
| 1,324,963 | A * | 12/1919 | Hayes | B43L 7/14 33/427 |
| 1,398,243 | A * | 11/1921 | Rosskopf | B25H 7/04 33/419 |
| 2,113,524 | A * | 4/1938 | Wolfe | B43L 13/00 33/342 |
| 3,358,372 | A * | 12/1967 | Johnson | B43L 7/12 33/473 |
| 4,267,642 | A * | 5/1981 | Stapleford | G01B 3/56 33/473 |
| 5,339,530 | A * | 8/1994 | Wright | G01B 3/566 33/379 |
| 6,119,354 | A * | 9/2000 | Hansen | B25H 7/04 33/27.03 |

(Continued)

*Primary Examiner* — R. A. Smith
*Assistant Examiner* — Tania Courson
(74) *Attorney, Agent, or Firm* — Guy Levi; The IP Law Firm of Guy Levi, LLC (57) ABSTRACT

A combination square for usage with a grooved blade, comprising: a straight component having a first straight edge and a second straight edge perpendicular to the first straight edge; an angled component having a third straight edge and an angled edge; a marked scale comprising degrees; a marker, wherein the square is configured to allow indication by the marker of angles on the scale; a slot configured to allow accommodating the blade; and a locking screw configured to allow clamping the combination square onto the blade at a desired position along the blade; wherein the angled component is rotatably connected to the straight component; and the square is further configured to allow measuring a center of a circle coupled to the second straight edge and the angled edge at a second end of range of motion of the rotation by the straight component relative to the angled component.

14 Claims, 13 Drawing Sheets

(56) References Cited

U.S. PATENT DOCUMENTS

| | | | |
|---|---|---|---|
| 6,785,976 B1 * | 9/2004 | Morehouse | B43L 7/005 33/418 |
| 7,337,550 B2 * | 3/2008 | Marcus | B43L 7/14 33/427 |
| 7,908,755 B2 * | 3/2011 | Rushing | B25H 7/00 33/419 |
| 9,441,934 B2 * | 9/2016 | Berthiaume | G01B 3/563 |
| 2007/0220764 A1 * | 9/2007 | Wolken | B43L 7/005 33/427 |
| 2012/0311880 A1 * | 12/2012 | Doggett | B43L 7/14 33/452 |

\* cited by examiner

COMBINATION SQUARE WITH SWIVEL HEAD

CROSS-REFERENCE TO RELATED APPLICATIONS

The present application claims priority from U.S. Provisional Patent Application 61/838,379 filed Jun. 24, 2013, and entitled "Combination Square with Swivel Head".

FIELD OF THE INVENTION

The present invention relates to measuring tools. More particularly, the present invention relates to squares, and more especially to combination squares.

BACKGROUND OF THE INVENTION

Combination square sets are commonplace tools traditionally used in woodworking, stonemasonry and metalworking. These sets are usually composed of a ruled blade and three interchangeable moving heads: a 45°/90° square head, a protractor head and center gradation head. These moving heads can slide along the ruled blade, and be clamped onto the blade at any desired location. By removing all of these heads, the blade can be used by itself as a standard ruler or as a straight edge.

The square head is designed with a 45° and also a 90° edge, which makes it possible for it to be used as a "try square" (i.e. a tool used for reliably measuring straight angles) and also as a "miter joint square" (i.e. a joint created by beveling two parts to be joined). The square head is also typically fitted with a level and a removable gradation scriber.

The combination square set can further be used for determining flatness (relative to a flat surface), measuring and setting angles between a base and the ruler (with the protractor), approximating leveled surfaces (with a rudimentary level), and gradation the work surface (with the scriber). The protractor head can be used to mark off or measure any angle from 0° to 180° (permitting the supplement of the angle to be read).

Thus, such a combination square set can provide a wide variety of operations and uses; however it also obliges the operator to carry three separate heads together with the ruler, since none of the heads can be used while a different head is mounted onto the blade. It will therefore be advantageous to provide a single compact combination square apparatus that can provide all possible operations of the combination square set, without requiring changing heads.

SUMMARY OF THE INVENTION

According to a first aspect of the invention, a combination square for usage with a grooved blade is provided, the square comprising:
  a straight component having a first straight edge and a second straight edge perpendicular to the first straight edge;
  an angled component having a third straight edge and an angled edge;
  a marked scale comprising angles;
  a marker; wherein the marker is on the straight component and the marked scale is on the angled component or marker is on the angled component and the marked scale is on the straight component, and the square is configured to allow indication by the marker of angles on the scale;
  a slot configured to allow accommodating the blade; and
  a locking screw configured to allow clamping the combination square onto the blade at a desired position along the blade;
  wherein:
  the angled component is rotatably connected to the straight component;
  the square is configured to allow the first straight edge and the third straight edge to be flush with each other at a first end of range of motion of the rotation by the straight component relative to the angled component;
  and the square is further configured to allow measuring a center of a circle coupled to the second straight edge and the angled edge at a second end of range of motion of the rotation by the straight component relative to the angled component.

In some embodiments, the straight component further comprises a spirit level housing.

In some embodiments, the combination square further comprises a spirit level housed in the spirit level housing.

In some embodiments, the angled edge is at 45 degrees relative to the straight edge.

In some embodiments, the combination square further comprises a second straight component fixedly connected to the first straight component.

In some embodiments, the combination square further comprises a second angled component fixedly connected to the first angled component.

In some embodiments, the locking screw further comprises an internally threaded knob, and a partially threaded body having an extension with a lateral protrusion.

In some embodiments, the lateral protrusion is accommodated in the groove of the blade.

According to a second aspect of the invention, a method for length approximation of a workpiece is provided, the method comprising:
  providing the combination square as described herein before;
  attaching the straight edge to the workpiece;
  engaging the blade with the slot;
  moving the blade to a desired position; and
  measuring the length from the ruled blade.

In some embodiments, the method further comprises clamping the combination square at a desired position on the blade.

In some embodiments, the method further comprises engaging the blade with a surface of the workpiece.

According to a third aspect of the invention, a method for angle approximation of a workpiece is provided, the method comprising:
  providing the combination square as described herein before;
  attaching the angled edge to the workpiece;
  engaging the blade with the slot;
  moving the blade to a desired position; and
  measuring the length from the ruled blade.

In some embodiments, the method further comprises clamping the combination square at a desired position on the blade.

In some embodiments, the method further comprises engaging the blade with a surface of the workpiece.

In some embodiments, the method further comprises swiveling the angled component relative to the straight component and measuring the relative angle using the scale and the marker.

According to a fourth aspect of the invention, a method for center approximation of a round workpiece is provided, the method comprising:

providing the combination square as described herein before;

swiveling the angled component relative to the straight component until a 90 degrees angle is formed;

introducing the round workpiece until it contacts both the straight edge and the angled edge;

engaging the blade with the slot;

moving the blade to a desired position along the surface of the round workpiece; and measuring the center of the round workpiece from the ruled blade.

In some embodiments, the method further comprises clamping the combination square at a desired position on the blade.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the specification, including definitions, will control. In addition, the materials, methods, and examples are illustrative only and not intended to be limiting.

BRIEF DESCRIPTION OF THE DRAWINGS

Embodiments are herein described, by way of example only, with reference to the accompanying drawings. With specific reference now to the drawings in detail, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Before explaining at least one embodiment in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For clarity, non-essential elements were omitted from some of the drawings.

Figure 1:
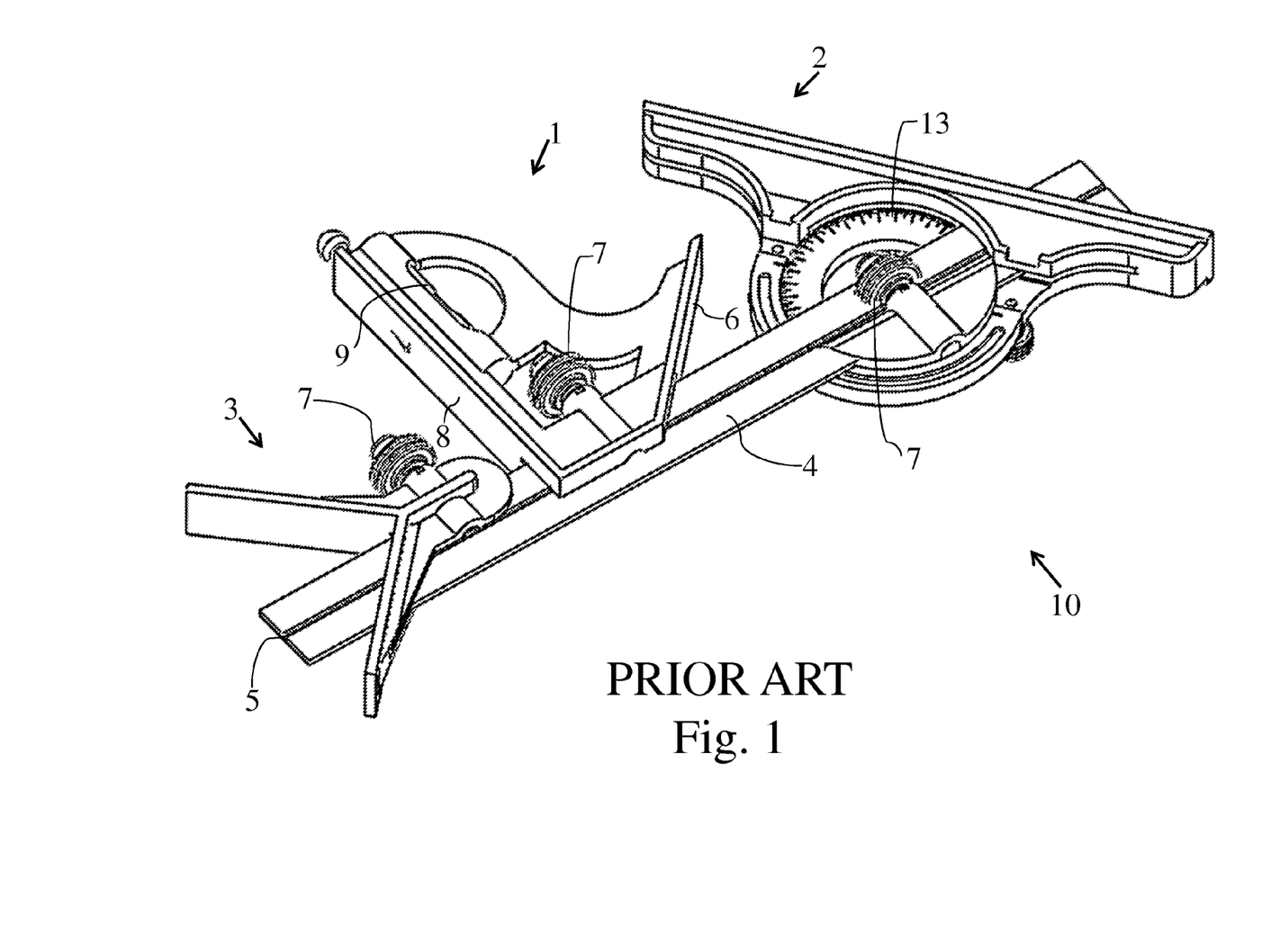
FIG. 1 illustrates a perspective view of a commercially available combination square set, according to an exemplary embodiment.

FIG. 1 illustrates a perspective view of a commercially available combination square set 10 including a square head 1 (having a fixed 45°/90° orientation), a protractor head 2, and a center gradation head 3. These heads are mounted on a ruled blade 4, and can slide along a groove 5 in the ruled blade 4. The ruled blade 4 is designed such that each head can be clamped onto the blade with a locking mechanism 7 at a desired position.

The square head 1 has a 45 degrees edge 6 and a 90 degrees edge 8 (providing fixed 45°/90° orientations), that allows measuring 45°/90° angles in surfaces using the edges 6, 8. The square head 1 can also be used as a height or depth gage by fixing the square head 1 in a desired position and moving the ruled blade 4 across the square head 1 to a second position. The square head 1 is further fitted with a leveling assembly 9, for approximating leveled surfaces.

The protractor head 2 can be used to mark off or measure any angle between 0° and 180° relative to the blade 4, with angular gradations 13 that allow the supplement of an angle to be read. The center head 3 can be used to locate and lay out the exact center of a round workpiece. In order to use one of these heads, the other heads must first be removed from the blade 4 since these heads must be exclusively mounted (due to their required contact with the surface of a workpiece).

Figure 2A:
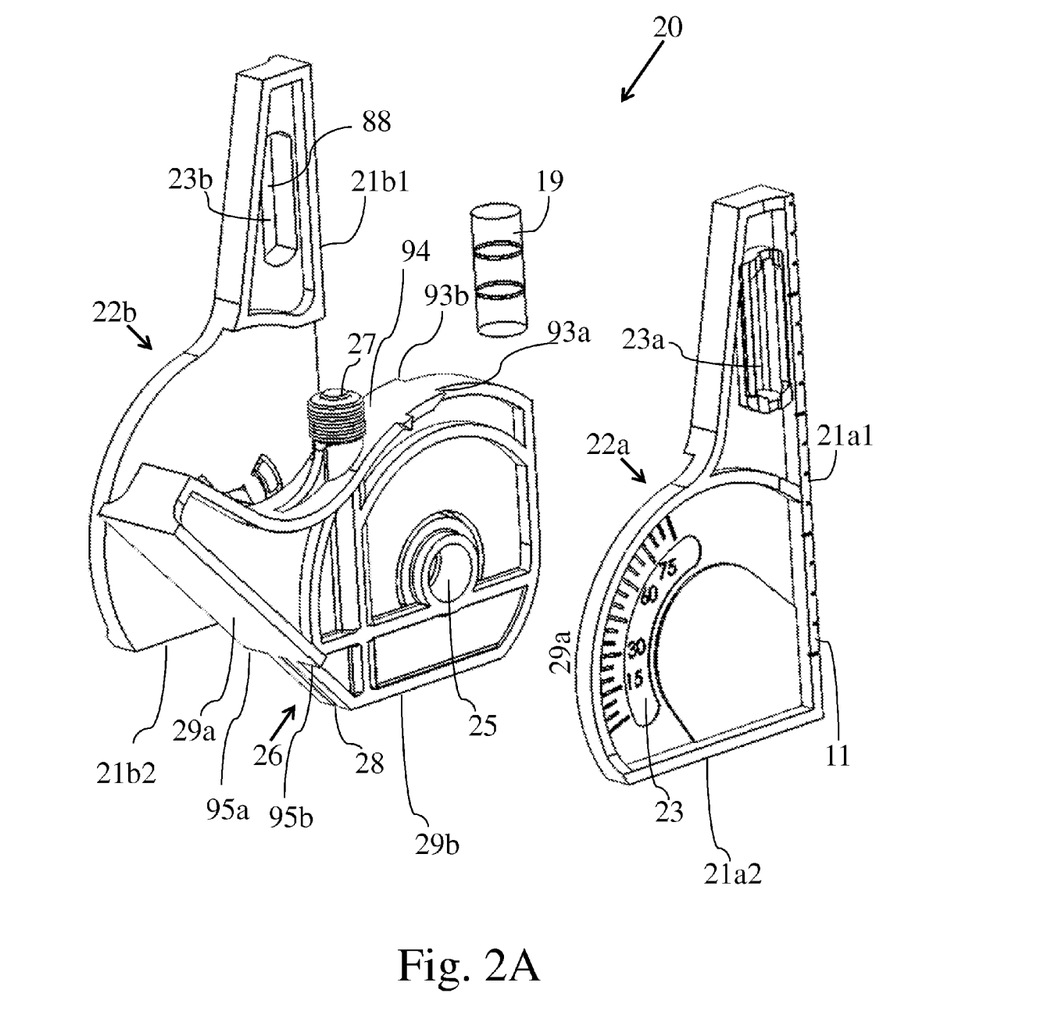
FIG. 2A illustrates an exploded frontal perspective view of a swivel combination square, according to an exemplary embodiment.
Figure 2B:
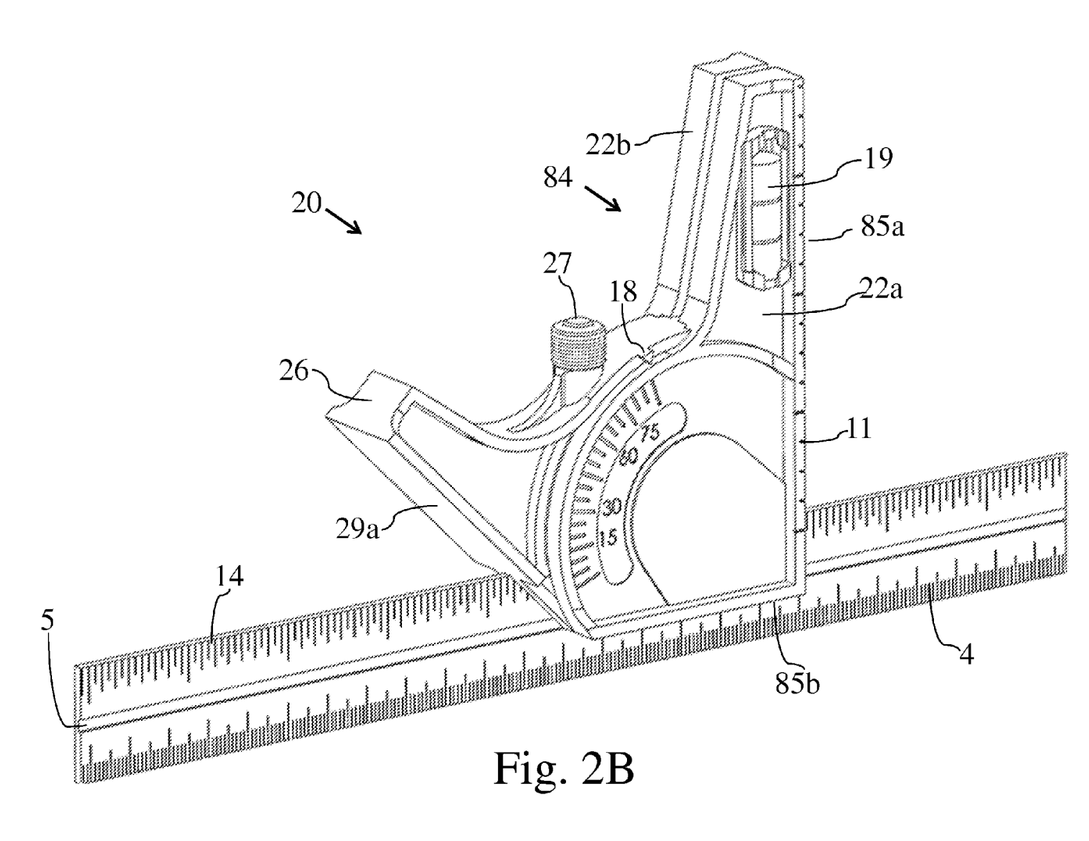
FIG. 2B illustrates an assembled perspective frontal view of the swivel combination square mounted on a ruled blade, according to an exemplary embodiment.

Referring now to FIGS. 2A-2B, these figures illustrate an apparatus that may provide all of the features of the commercially available combination square set 10 (shown in FIG. 1) in a single device, without the need for changing heads. FIG. 2A illustrates an exploded frontal perspective view of a swivel combination square 20, and FIG. 2B illustrates an assembled frontal view of the swivel combination square 20 mounted on a ruled blade 4. The swivel combination square 20 includes a first straight component 22a, a second straight component 22b, an angled component 26, and a spirit level 19.

The spirit level 19 may be any rudimentary level (similarly to the leveling assembly 9, shown in FIG. 1) for evaluation of leveled surfaces. It should be noted that FIGS. 2A-2B illustrate the frontal side of the swivel combination square 20 that should be visible to an operator during usage of the swivel combination square 20, and additional features (visible at the back side) are illustrated in FIGS. 3A-3B.

Figure 3A:
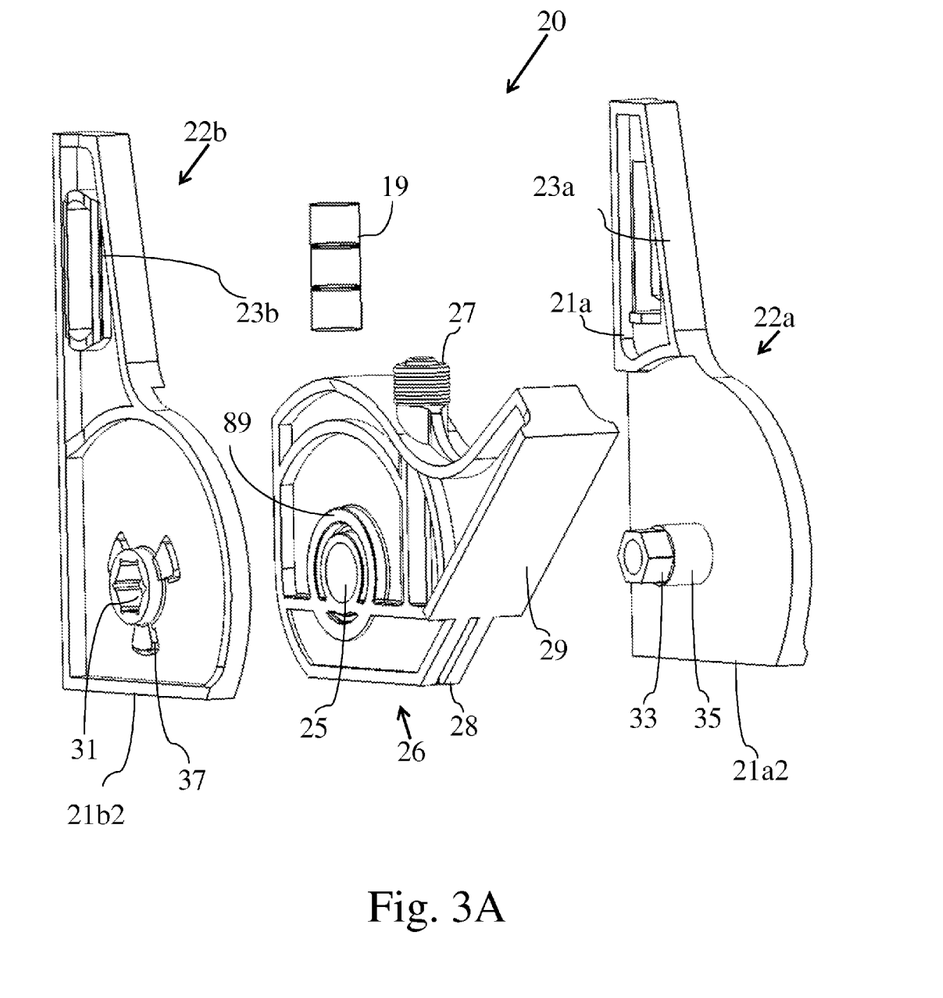
FIG. 3A illustrates an exploded perspective back view of the swivel combination square, according to an exemplary embodiment.
Figure 3B:
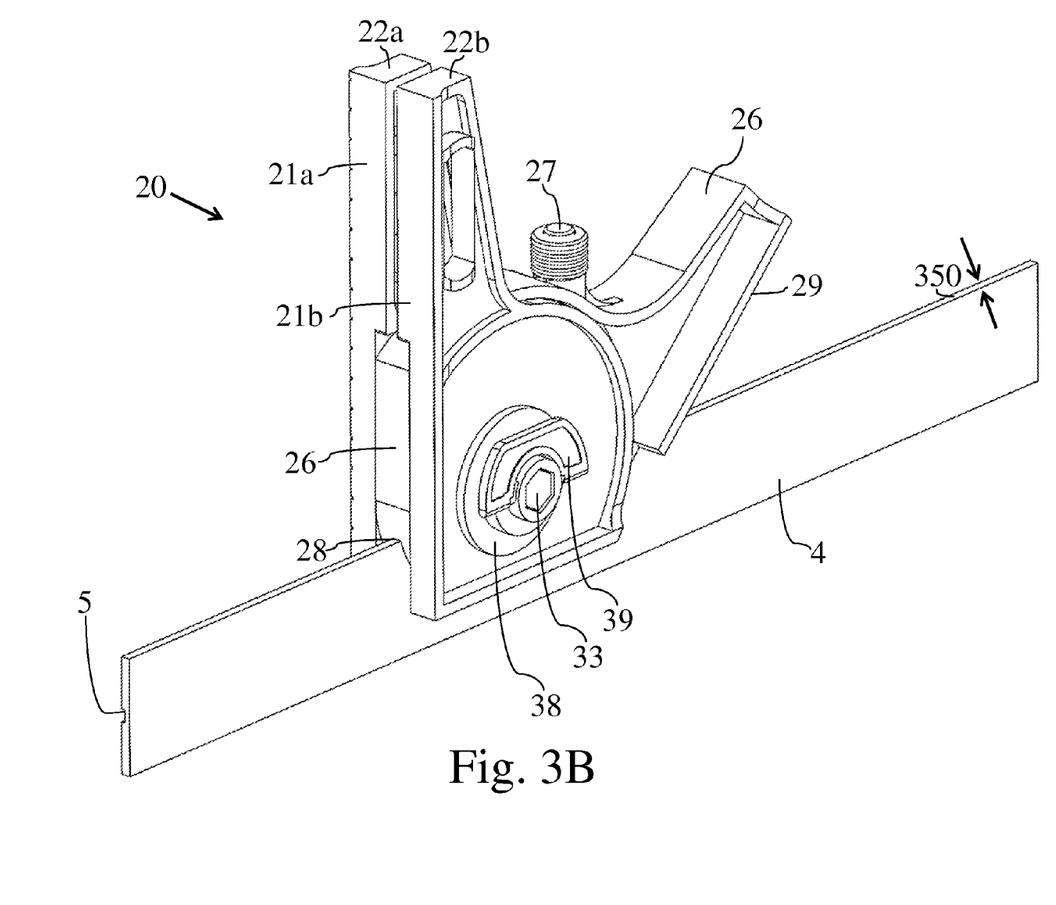
FIG. 3B illustrates an assembled perspective back view of the swivel combination square mounted on the ruled blade, according to an exemplary embodiment.

FIG. 3A illustrates an exploded back view of the swivel combination square 20, and FIG. 3B illustrates an assembled back view of the swivel combination square 20 mounted on the ruled blade 4. The first straight component 22a has a first straight edge 21a1 and a second straight edge 21a2 perpendicular to each other, and the second straight component 22b has complementary third and fourth edges 21b1 and 21b2, such that when combined, as shown in FIG. 2b, the first and second straight components 22a, 22b create a full straight component 84 with straight fifth and sixth edges 85a, 85b perpendicular to each other (similarly to the 90 degrees edge 8, shown in FIG. 1). Such a full straight component may be swiveled relative to the angled component 26 over a restricted range of motion (further described herein after).

The angled component 26 has a seventh straight edge 29b and an eighth straight edge 29a at a non-straight angle to the seventh straight edge 29b, typically the angle is 135°.

The first straight component 22a has multiple gradations 11 (visible from the frontal side during usage by the operator) at the first straight edge 21a, that may be used for height or depth determination when combined with distance gradations 14 on the ruled blade 4. In addition to the multiple gradations 11, the first straight component 22a may further have a scale 23 (similar to the angular gradations 13 of the protractor 2, shown in FIG. 1) for indication on angles relative to the ruled blade 4. The reading of an angle may be carried out using a fixed marker 18 at the angled component 26, when the full straight component with a straight 90 degrees edge swivels relative to the ruled blade 4 (further described in FIG. 8).

The spirit level 19 may be housed in a first level housing 23a, with the first level housing 23a having at least one opening 88 such that the spirit level 19 is visible through that opening 88. Optionally, a second spirit level (not shown) may be housed in a second level housing 23b, with the second level housing 23b having at least one opening such that the second spirit level may be visible. It should be noted that in case that only a single spirit level 19 is used and housed in the first level housing 23a, then the spirit level 19 may be visible from the opening in the second level housing 23b (once the swivel combination square 20 is assembled).

The angled component 26 has a 45 degrees edge 29a for evaluating surfaces, typically at an angle 45° relative to the blade 4, a channel 25 providing a path for connecting the first straight component 22a to the second straight component 22b, a slot 28 capable of accommodating a component of the blade 4, and a thumb locking screw 27 similar to the locking mechanism, shown in FIG. 1. The thumb locking screw 27 extends throughout (see FIG. 4b) the angled component 26 until it protrudes into the slot 28. By clamping onto the groove 5 of the blade 4, the thumb locking screw 27 is capable of locking the angled component 26 at a desired position. The structure and operation of the thumb locking screw 27 are further described in FIGS. 4A-4B.

Therefore, once the swivel combination square 20 is assembled and the first straight component 22a, the second straight component 22b and the angled component 26 are connected together, then by locking the thumb locking screw 27, the entire swivel combination square 20 may be clamped onto the blade 4 at a desired position.

The first straight component 22a has a threaded and cylindrical protruding portion 35 with a connecting nut 33 (e.g. with a hexagonal shape) engagable with the protruding portion 35. By assembling the first straight component 22a and the angled component 26, the protruding portion 35 is accommodated in the channel 25 and extends beyond the channel 25, whereby the first straight component 22 may swivel relative to the angled component 26.

The second straight component 22b has a connecting passage 31 also essentially corresponding in shape and size to the protruding portion 35 which extends beyond the connecting passage 31 to allow threading thereon the nut 33. The second straight component 22b further has connected thereto or fused thereon a plurality of flaps 37 that penetrate the component 22b and impinge upon an elevated ring 89 on the angled component 26 (see FIG. 3A) when pressure is applied to them by a tightening knob 38 held by nut 33. A wing nut 39 may be employed to manually tighten onto the nut 33. Thus the first and second straight components 22a, 22b may be fastened to the angled component 26. When the knob 38 is not fastened, since the first straight component 22 and the second straight component 24 are only coupled to each other and not to the angled component 26, it is possible to swivel the connected first straight component 22 and second straight component 24 relative to the angled component 26.

In other embodiments the connecting element has a thread extending therein (not shown) into which a bolt may be threaded; the bolt is placed over or into a tightening knob and screwed to press the knob against the flaps. The second straight component typically has slits into which teeth at the end of the flaps fit, the teeth reach the elevated ring when the flaps are pressed.

When the straight components are made of plastic the flaps may be part of the second straight component. When the straight components are made of metal the flaps are typically legs on a plastic ring, and the legs are inserted into slits in the straight components.

It should be noted that the procedure for connecting the first straight component 22 to the second straight component 24 (as described in FIGS. 3A-3B) is an exemplary embodiment, where the straight components 22, 24 may be connected in any other procedure configured to allow swiveling relative to the angled component 26.

When the combination square 20 is fully assembled the closest distance between the straight components is preferably more than the thickness 350 of the ruler 4 to allow the straight components a rotation with a range of motion of at least 90°. The angled component has four steps: long steps 93a, 93b on the long edge 94 of the angled component 26, and angle steps 95a, 95b on the angle side 29a of the angled component 26. The long steps delimit the rotation of the straight component 24 so that sides 21b2, 21a2 and 29b are flush with each other and thus lie on the same imaginary plane. Note that in order for the components' sides to be flush, the channel 25, passage 31 and protruding portion 35 must be equidistant from their respective sides 21a2, 26b and 21b2. The components thus must be designed with accordingly matching sizes in respect of each other. The angle steps delimit the rotation of the straight component 24 so that measurement of the centre of a circle is possible with the combination square 20. This may be accomplished by having the angle steps 95a and 95b and the slot 28 equidistant from the side 29b of the angled component.

Figure 4A:
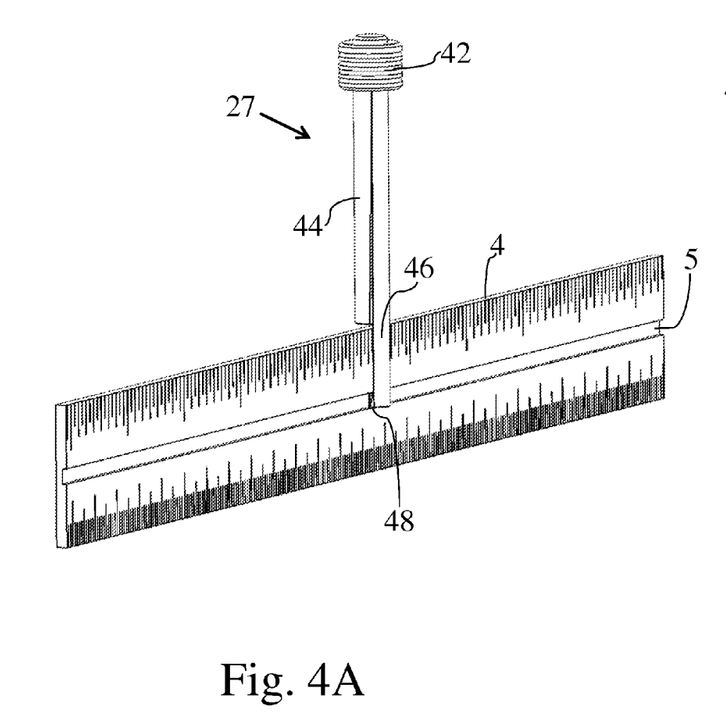
FIG. 4A illustrates a thumb locking screw coupled to the ruled blade, according to an exemplary embodiment.
Figure 4B:
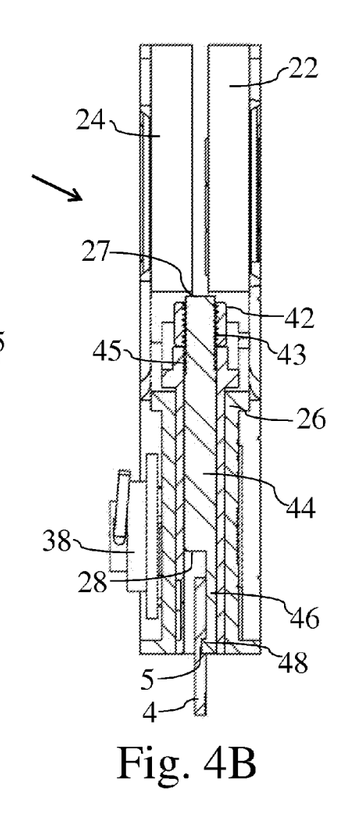
FIG. 4B illustrates a cross-sectional side view of the swivel combination square clamped onto the ruled blade, according to an exemplary embodiment.

Referring now to FIGS. 4A-4B, FIG. 4A illustrates the thumb locking screw 27 coupled to the ruled blade 4 with other elements of the swivel combination square 20 removed, and FIG. 4B illustrates a cross-sectional side view of the swivel combination square 20 clamped onto the ruled blade 4. The thumb locking screw 27 includes an internally threaded knob 42 that sits on the angled component 26, and a partially threaded body 44 having an extension 46.

The extension 46 allows clamping the thumb locking screw 27 onto the blade 4: The lateral projection 48 may be received within the groove 5, such that while the swivel combination square 20 moves along the blade 4, the lateral projection 48 remains within the groove 5. By tightening the knob 42 onto the angled component 26 (i.e. turning the knob 42 by hand with minimal force), the cylindrical body 44 may move towards the knob 42 (due to the threading) and therefore the lateral projection 48 should also move towards the knob 42. As the lateral projection 48 is confined in the groove 5, then movement of the lateral projection 48 may clamp the blade 4 between the lateral projection 48 and the slot 28.

In order to fix the swivel combination square 20 to the new desired position, the thumb locking screw 27 is released (by turning the knob 42 in the opposite direction) in order to move the swivel combination square 20 to a desired position on the blade 4. The knob 42 may be tightened again onto the angled component 26 so that the blade 4 is clamped by the thumb locking screw 27. It should be noted that as the swivel combination square 20 slides along the blade 4, the lateral projection 48 remains inside the groove 5, and in order to initially fit the swivel combination square 20 onto the blade 5 it may be necessary to introduce the blade 4 into the slot 28 such that the lateral projection 48 engages the groove 5.

In another embodiment, the swivel combination square 20 may be clamped onto the ruled blade using magnets (for instance at the extension, in case that the blade 4 is made of a material capable of attaching to a magnet (e.g. a steel blade).

In a further embodiment, the swivel combination square may be held at a desired position while the blade moves across the slot in order to achieve depth determination for a workpiece.

Figure 5:
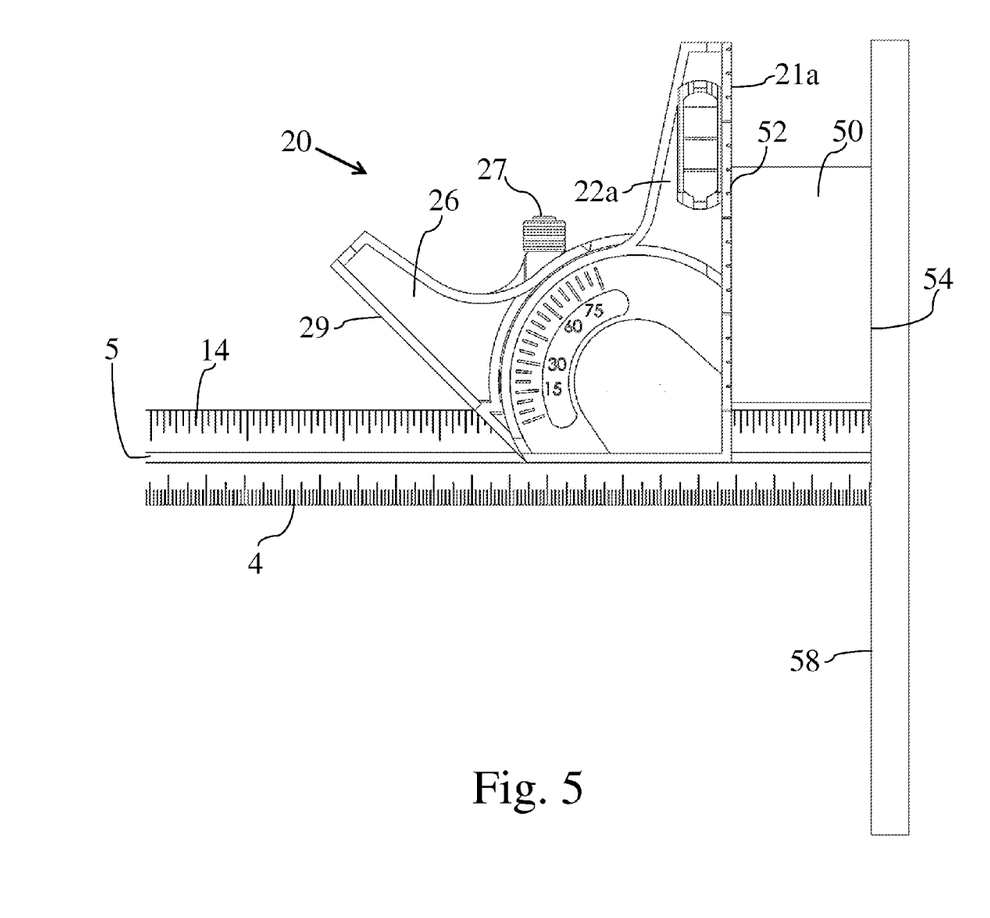
FIG. 5 illustrates a depth measurement of a workpiece using the swivel combination square and the blade, according to an exemplary embodiment.
Figure 6:
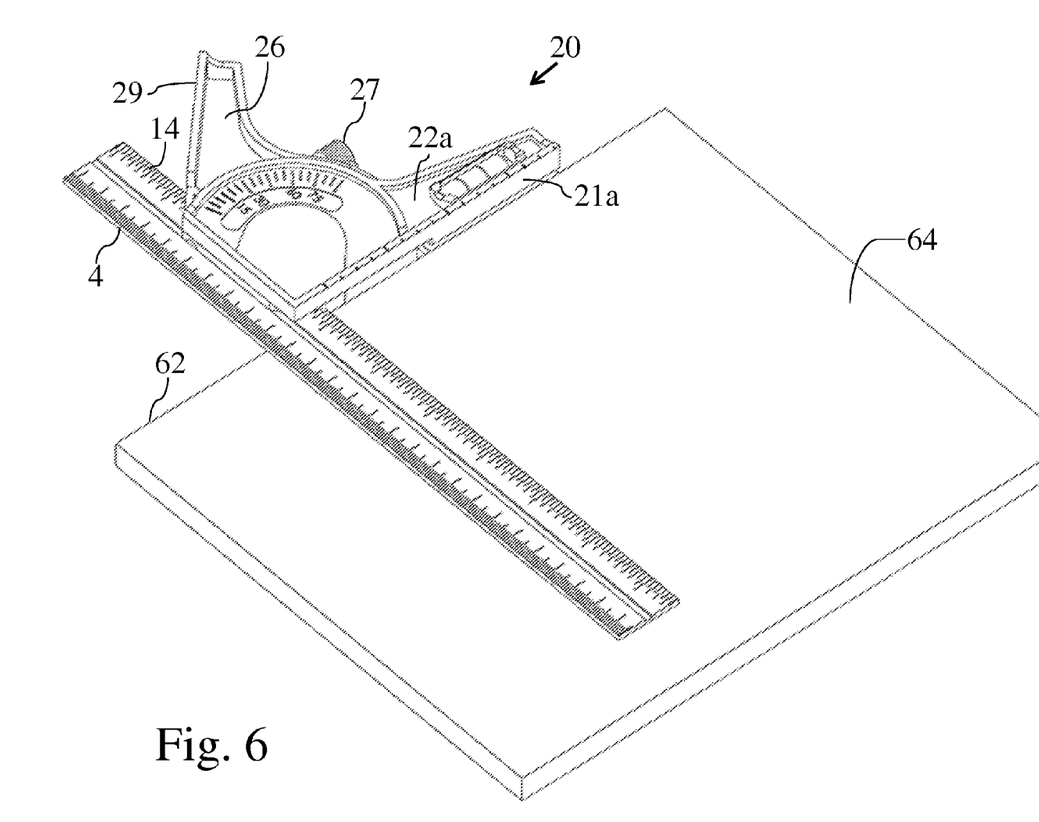
FIG. 6 illustrates determination of straight lines on a surface of a workpiece using the swivel combination square and the blade, according to an exemplary embodiment.
Figure 7:
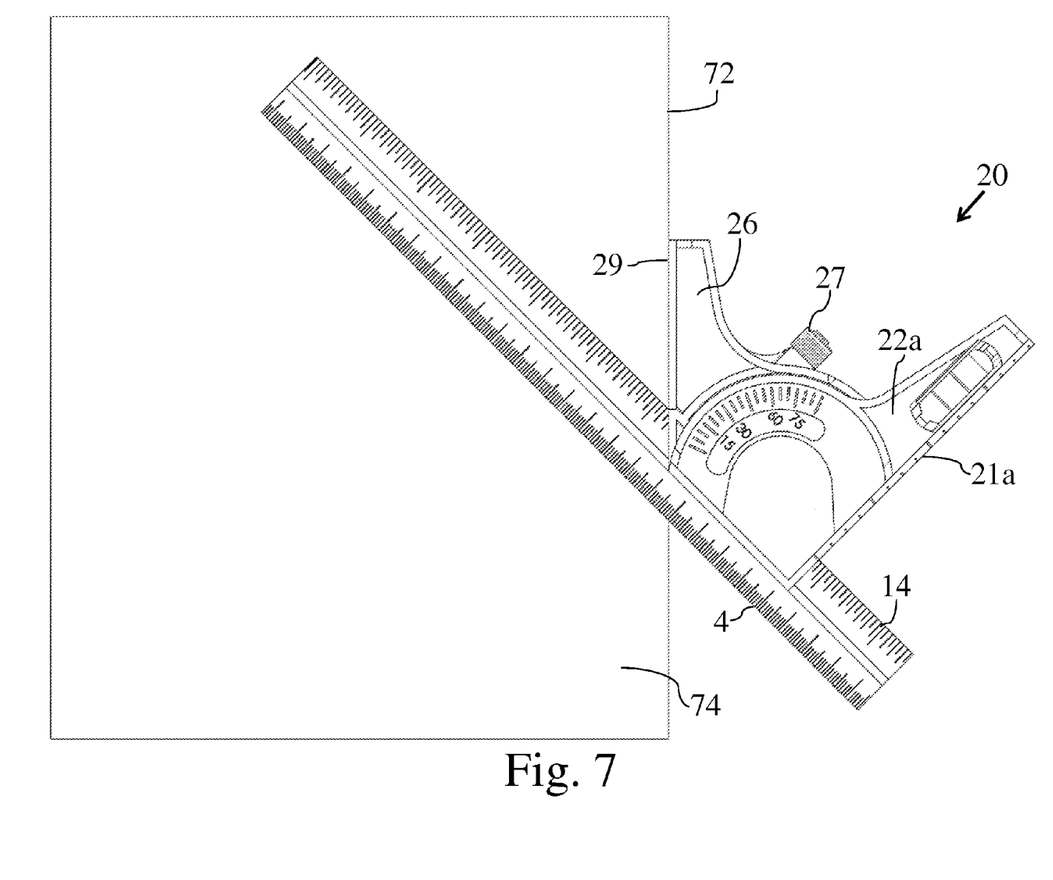
FIG. 7 illustrates determination of 45 degrees lines on a surface of a workpiece using the swivel combination square and the blade, according to an exemplary embodiment.
Figure 8:
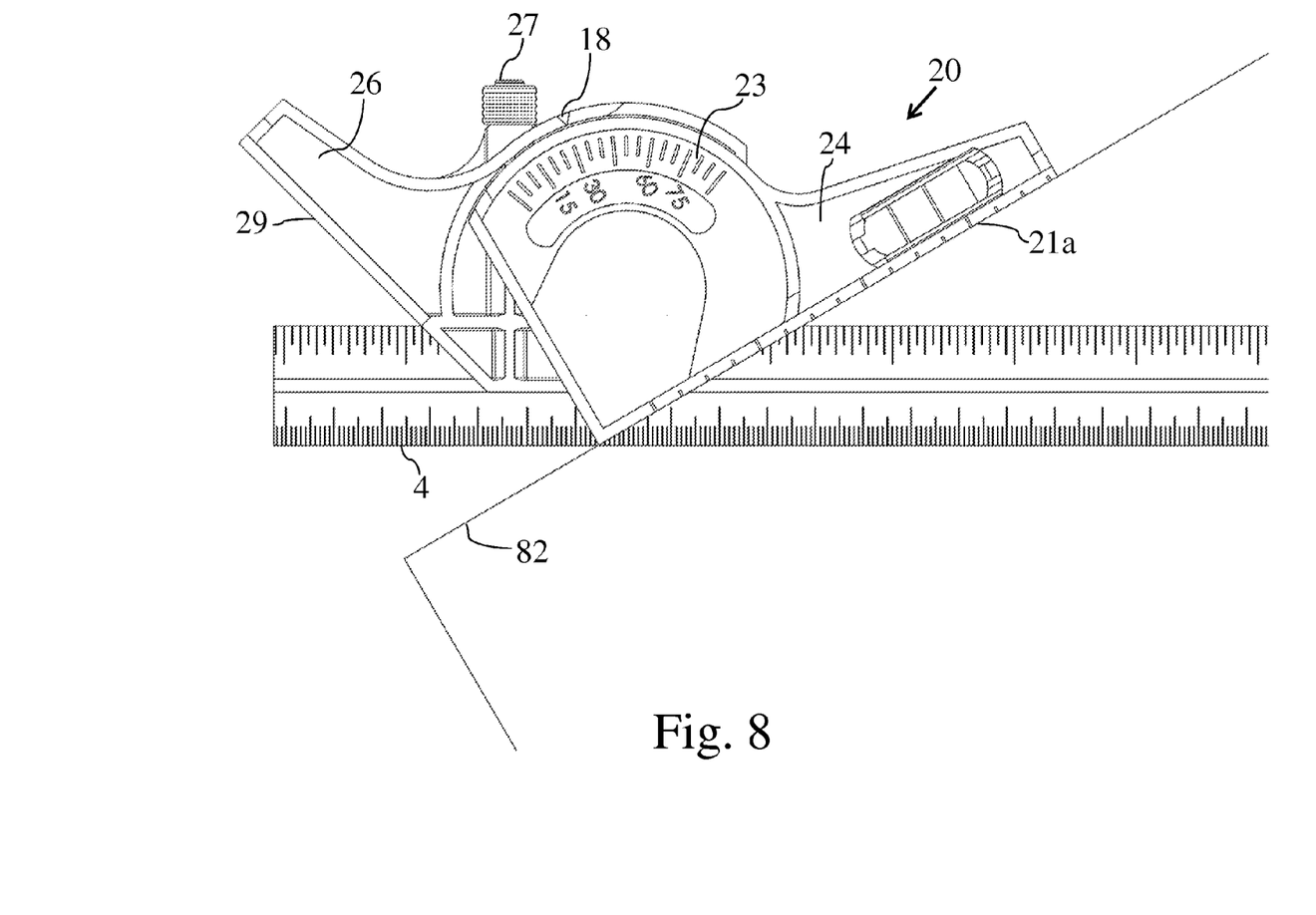
FIG. 8 illustrates determination of angles on a surface of a workpiece using the swivel combination square and the blade, according to an exemplary embodiment.
Figure 9:
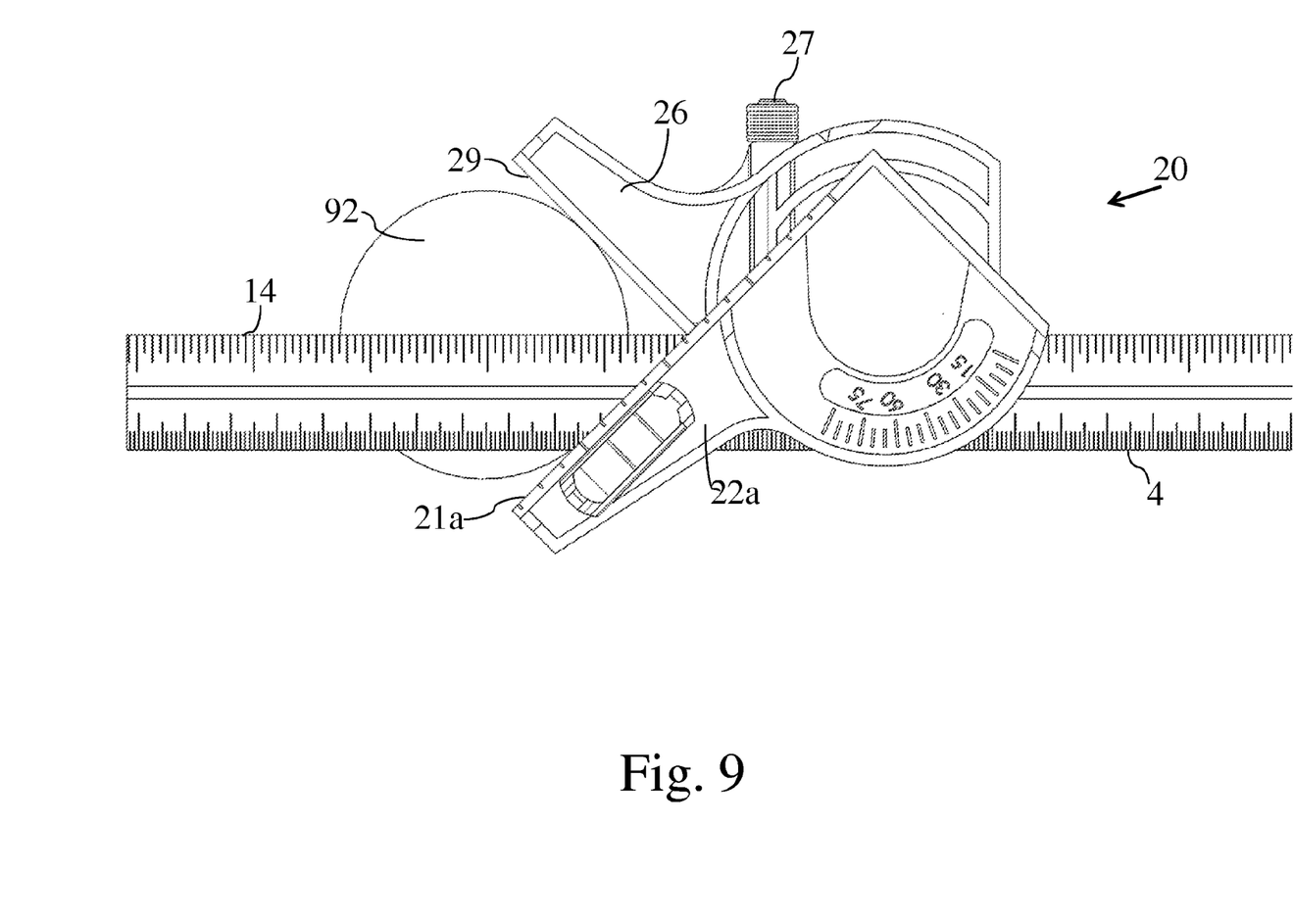
FIG. 9 illustrates determination of the center of a round workpiece using the swivel combination square and the blade, according to an exemplary embodiment.

Referring now to FIGS. 5-9, these figures illustrate different methods of using the swivel combination square 20 in order to achieve the different features available with the combination square set 10 (shown in FIG. 1). FIGS. 5-7 illustrate methods of using the swivel combination square 20 to achieve the features available with the square head 1 (shown in FIG. 1), FIG. 8 illustrates a method of using the swivel combination square 20 to achieve the features available with the protractor head 2 (shown in FIG. 1), and FIG. 9 illustrates a method of using the swivel combination square 20 to achieve the features available with the center head 3 (shown in FIG. 1).

FIG. 5 illustrates a depth measurement of a workpiece 50 using the swivel combination square 20 and the blade 4. By placing a distal side 54 of the workpiece 50 adjacent to a straight working surface 58, the depth of the workpiece 50 may be measured by placing the first straight edge 21a adjacent to a proximal side 52 of the workpiece 50. In this state, the blade 4 may be moved through the slot of the angled component 26 (with the lateral projection sliding along the groove 5) until the blade 4 contacts the straight working surface 58. Optionally, the swivel combination square 20 may be locked in this position with the thumb locking screw 27. Finally the depth of the workpiece 50 may be measured by reading the distance gradations 14 from the ruled blade 4, between the proximal side 52 and the distal side 54.

FIG. 6 illustrates determination of straight lines on a surface 64 of a workpiece using the swivel combination square 20 and the blade 4. By placing the first straight edge 21a adjacent to a proximal side 62 of the workpiece (such that the surface of the blade 4 is flat against the surface 64 of the workpiece), the blade 4 may be moved through the slot of the angled component 26 until the blade 4 reaches a desired length on the surface 64 of the workpiece. Optionally, the swivel combination square 20 may be locked in this position with the thumb locking screw 27. Finally the length of the workpiece may be measured by reading the distance gradations 14 from the ruled blade 4. Additional uses of this state may include laying out a straight line across the surface 64 of the workpiece, or laying out parallel straight lines across the surface 64 of the workpiece (by moving the swivel combination square 20 to a different position along the proximal side 62 of the workpiece).

FIG. 7 illustrates determination of 45 degrees lines on a surface 74 of a workpiece using the swivel combination square 20 and the blade 4. Similarly to the method described in FIG. 6 for straight lines, by placing the angled 45 degrees edge 29 to be adjacent to a proximal side 72 of the workpiece (such that the surface of the blade 4 is adjacent to the surface 74 of the workpiece), the blade 4 may be moved through the slot of the angled component 26 until the blade 4 reaches a desired length on the surface 74 of the workpiece. Optionally, the swivel combination square 20 may be locked in this position with the thumb locking screw 27. Finally a 45 degrees layout is achieved on the workpiece, and distances may be measured by reading the distance gradations 14 from the ruled blade 4.

FIG. 8 illustrates determination of angles on a surface 82 of a workpiece using the swivel combination square 20 and the blade 4. Similarly to a commercially available protractor 2 (as shown in FIG. 1), the first straight component 24 is initially swiveled relative to the angled component 26 until the first straight edge 21a is flush with a proximal side 82 of the workpiece. Optionally, the swivel combination square 20 may be locked in this position with the thumb locking screw 27. The angled component 26 may then be rotated relative to the first straight component 22 (having the same pivot) so that their relative angle may be measured using the marker 18 (of the angled component 26) and reading the scale 23 (of the straight component 22).

Alternatively, a desired relative angle may be set by rotating the angled component 26 relative to the first straight component 22 until the required angle may be read from the scale 23. In this state, the workpiece may be marked with lines for this angle.

FIG. 9 illustrates determination of the center of a round workpiece 92 using the swivel combination square 20 and the blade 4. Similarly to a commercially available center head 3 (as shown in FIG. 1), the center of a round workpiece 92 may be located or marked. The first straight component 22 may be initially swiveled relative to the angled component 26 until a 90 degrees angle is formed between them. The next step is to introduce the round workpiece 92 until it contacts both the first straight edge 21a and to the angled 45 degrees edge 29, such that the blade 4 may slide along the surface of the round workpiece 92. Optionally, the swivel combination square 20 may be locked in this position with the thumb locking screw 27.

The exact center of the round workpiece 92 may be located using the gradations 14 of the ruled blade 4, since these gradations 14 appear exactly on the blade 4 between the first straight component 22 and the angled component 26. Optionally, the center of the round workpiece 92 may by marked for further operations in the future.

Figure 10A:
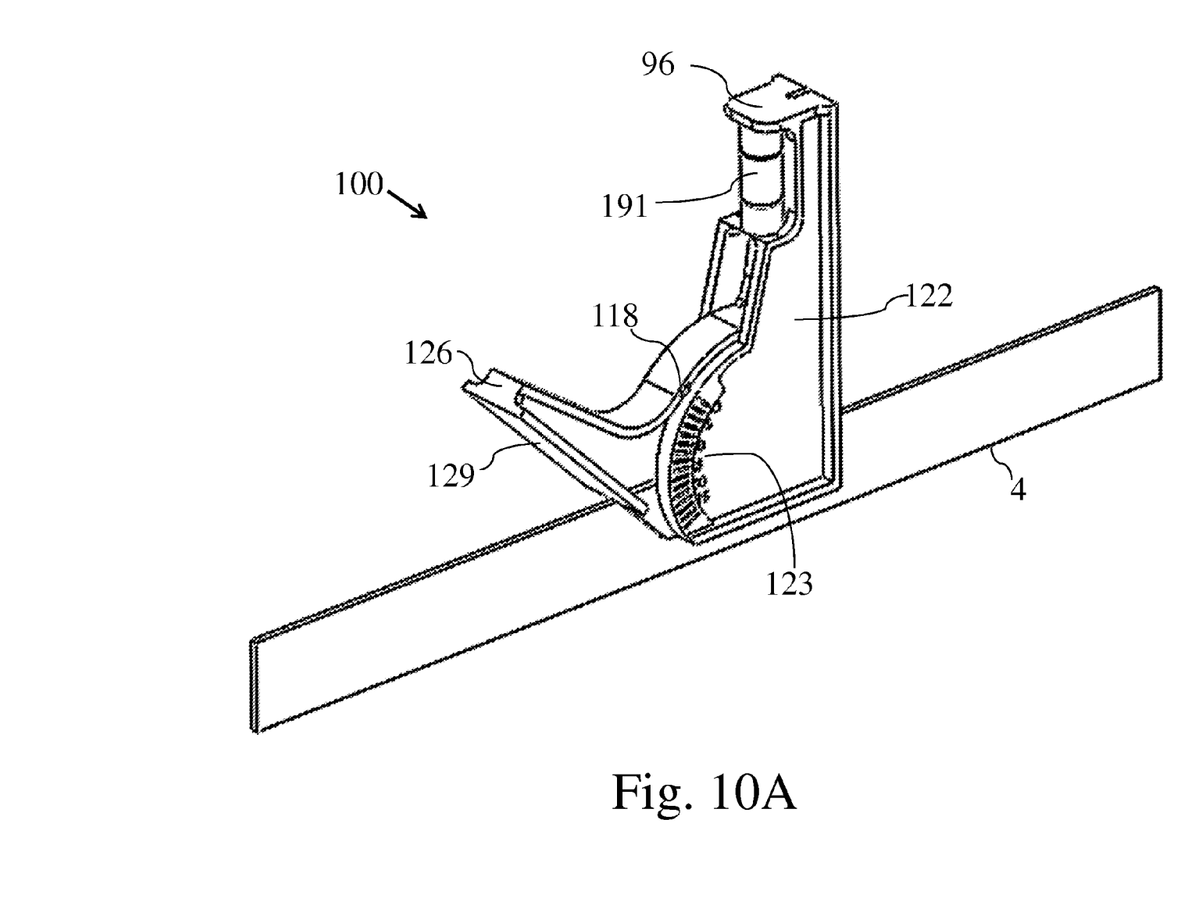
FIG. 10A illustrates a perspective view of the swivel head combination square with the 45 degree edge swiveling, according to an exemplary embodiment.
Figure 10B:
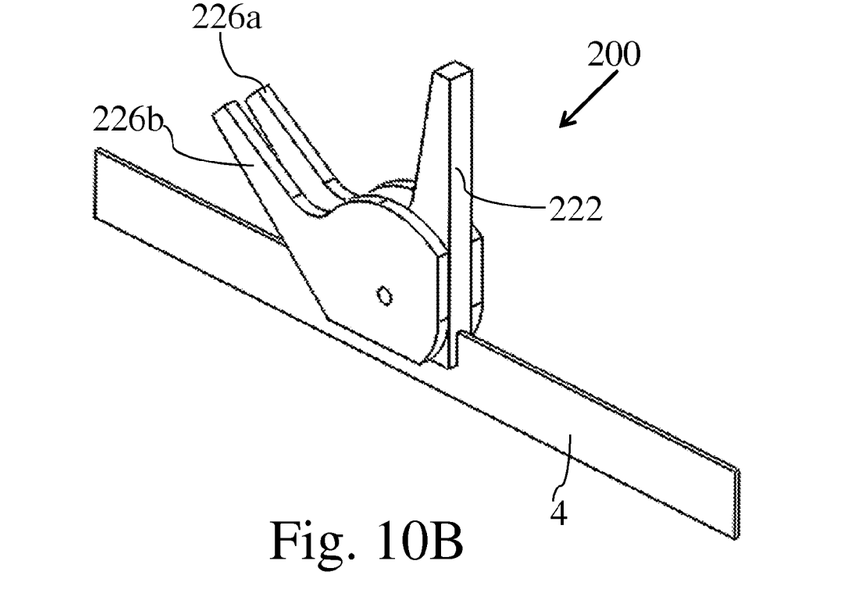
FIG. 10B illustrates a perspective view of the swivel head combination square, where the 45 degree edge connecting at the end, and is swiveling, according to an exemplary embodiment.
Figure 10C:
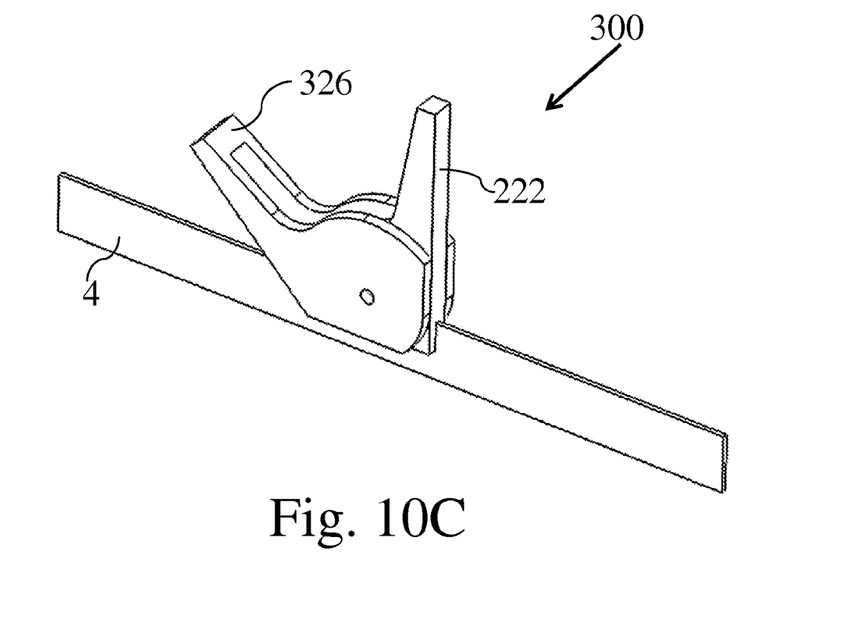
FIG. 10C illustrates a perspective view of the swivel head combination square, where the 90 degree edge is connecting at the end, according to an exemplary embodiment.

Referring now to FIGS. 10A-10C, these figures illustrate additional embodiments of the swivel combination square 20.

In a preferred embodiment (shown in FIG. 10A), a swivel combination square 100 comprises only two connected components, namely one straight component 122 and one angled component 126 that may swivel relative to each other. It should be noted that elements with similar features have numerals increased by a hundred.

In such a case, the swivel combination square is able to perform the same operations of the combination square set (as in the case of a swivel combination square having three components), as shown. However, to perform a full rotation within the range of motion allowed by the steps, the swivel combination square must be moved to an end of the ruler 4 to allow the "bridge" 96 to bypass the ruler 4.

In a further embodiment (shown in FIG. 10B), a swivel combination square 200 comprises two angled components 226a, 226b and one straight component 222, such that this straight component 222 is clamped onto the blade 4 with the two angled components (connected together, similarly to the two straight components as shown in FIG. 2B) swiveling relative to the straight component 222.

In a further embodiment (shown in FIG. 10C), a swivel combination square 300 comprises a single angled components 326 and one straight component 222, such that this straight component 222 is clamped onto the blade 4 with the angled component 326 swiveling relative to the straight component 222 (similarly to the single straight component 122, as shown in FIG. 10A).

In a further embodiment, the swivel combination square may further comprise an additional spring mechanism (not shown) for reinstating the straight and angled components to their initial positions after usage.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A combination square for usage with a single grooved blade, the square comprising:
   a. a first component and a second component each having a first straight edge and a second straight edge, wherein the first straight edge and the second straight edge are perpendicular to each other and wherein each of the first and second components comprises an arcuate angle scale;
   b. a third component having a first straight edge and a second angled edge, the second angled edge is at 45° degrees relative to the first edge of the third component, wherein the third component is rotatably coupled between the first component and the second component having perpendicular first straight edge and second straight edge;
   c. a single grooved and ruled blade, slidably coupled to a slot defined in the first straight edge of the third component;
   d. a marker operably coupled to the arcuate angle scale;
   e. a locking screw, extending through the third component, operably coupled to the single grooved and ruled blade, the locking screw configured to lock the position of the third component relative to the first and second components, while allowing the grooved and ruled blade to slidably move relative to the third component.

2. The combination square of claim 1, wherein the first component and a second component each having a first straight edge and a second straight edge further comprise a spirit level housing therebetween.

3. The combination square of claim 2, further comprising a spirit level housed in the spirit level housing.

4. The combination square of claim 1, wherein the locking screw further comprises an internally threaded knob, and a partially threaded body having an extension with a lateral protrusion.

5. The combination square of claim 1, wherein a lateral protrusion is accommodated in the groove of the blade.

6. A method for length approximation of a workpiece, comprising: providing the combination square of claim 1; attaching the straight edge to the workpiece; engaging the blade with the slot; moving the blade to a desired position; and measuring the length from the ruled blade.

7. The method of claim 6, further comprising clamping the combination square at a desired position on the blade.

8. The method of claim 6, further comprising engaging the blade with a surface of the workpiece.

9. A method for angle approximation of a workpiece, comprising: providing the combination square of claim 1; attaching the angled edge to the workpiece; engaging the blade with the slot; moving the blade to a desired position; and measuring the length from the ruled blade.

10. The method of claim 9, further comprising clamping the combination square at a desired position on the blade.

11. The method of claim 9, further comprising engaging the blade with a surface of the workpiece.

12. The method of claim 9, further comprising swiveling the angled component relatively to the straight component and measuring the relative angle using the scale and the marker.

13. A method for center approximation of a round workpiece, comprising: providing the combination square of claim 1; swiveling the angled component relatively to the straight component until a 90 degrees angle is formed; introducing the round workpiece until it contacts both the straight edge and the angled edge; engaging the blade with the slot; moving the blade to a desired position along the surface of the round workpiece; and measuring the center of the round workpiece from the ruled blade.

14. The method of claim 13, further comprising clamping the combination square at a desired position on the blade.

* * * * *